(12) United States Patent
Ganesan et al.

(10) Patent No.: US 12,500,821 B2
(45) Date of Patent: Dec. 16, 2025

(54) SYSTEM AND APPROACH OF WIRELESS SENSOR AUTO ROUTING USING MACHINE LEARNING

(71) Applicant: Honeywell International Inc., Charlotte, NC (US)

(72) Inventors: Balamurugan Ganesan, Bengaluru (IN); Surekha Deshpande, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 322 days.

(21) Appl. No.: 18/309,708

(22) Filed: Apr. 28, 2023

(65) Prior Publication Data

US 2024/0364598 A1 Oct. 31, 2024

(51) Int. Cl.
*H04L 41/16* (2022.01)
*H04L 45/28* (2022.01)

(52) U.S. Cl.
CPC .............. *H04L 41/16* (2013.01); *H04L 45/28* (2013.01)

(58) Field of Classification Search
CPC ................................ H04L 41/16; H04L 45/28
USPC ......................................................... 370/389
See application file for complete search history.

(56) References Cited

U.S. PATENT DOCUMENTS

| | | | | |
|---|---|---|---|---|
| 10,637,718 B2 * | 4/2020 | Lakshminarayan | .... | H04L 67/12 |
| 10,667,346 B2 * | 5/2020 | Deixler | ................ | G06V 20/00 |
| 11,218,878 B2 * | 1/2022 | Dawes | .................... | H04L 63/10 |
| 11,361,245 B2 * | 6/2022 | Mopur | ................... | G06N 20/00 |
| 11,488,377 B1 * | 11/2022 | Xu | .......................... | G06V 20/58 |
| 11,551,115 B2 | 1/2023 | Yussouff | | |
| 11,792,108 B2 * | 10/2023 | Ghosh | ................. | H04L 43/0876 370/237 |
| 11,792,330 B2 * | 10/2023 | Baum | .................... | H04M 11/04 709/226 |
| 11,812,359 B2 * | 11/2023 | Mody | .................... | H04W 40/12 |
| 12,095,648 B2 * | 9/2024 | Sesha | ........................ | G06N 5/01 |
| 12,184,443 B2 * | 12/2024 | Dawes | ................ | H04L 12/2825 |
| 12,223,307 B2 * | 2/2025 | Seawall | .................... | G06F 8/60 |

(Continued)

FOREIGN PATENT DOCUMENTS

CN 115175268 A 10/2022
KR 2020103198 A 9/2020

(Continued)

OTHER PUBLICATIONS

Huang et al., "Resilient Routing Mechanism for Wireless Sensor Networks With Deep Learning Link Reliability Prediction", IEEE Access, vol. 8, pp. 64857-64872, Mar. 31, 2020.

(Continued)

*Primary Examiner* — Melvin H Pollack
(74) *Attorney, Agent, or Firm* — Seager, Tufte & Wickhem, LLP

(57) ABSTRACT

A system relating to using machine learning and associated technologies for auto routing of wireless sensors to one of the multiple radio frequency (RF) portals/gateways which in turn may be interfaced/wired to control panel(s). A deployed machine learning algorithm may incorporate current parameters and historical data, such as signal strength, sensor association, critical sensor response types and disruption in the network, to determine sensor routing for one of the appropriate RF portal/gateway which in turn is interfaced to control panel(s).

20 Claims, 1 Drawing Sheet

(56) References Cited

U.S. PATENT DOCUMENTS

| | | | |
|---|---|---|---|
| 12,256,294 B2* | 3/2025 | Belt | H04W 4/029 |
| 12,259,254 B2* | 3/2025 | Guim Bernat | G01C 21/3423 |
| 12,267,385 B2* | 4/2025 | Kitchen | H04L 67/55 |
| 12,353,181 B2* | 7/2025 | Cella | H04L 67/565 |
| 2017/0193395 A1 | 7/2017 | Limonad et al. | |
| 2021/0117268 A1* | 4/2021 | Koeberl | H04L 63/0442 |
| 2021/0409306 A1* | 12/2021 | Neog | G06N 20/00 |
| 2022/0321464 A1* | 10/2022 | Woodland | H04W 40/28 |
| 2023/0284022 A1* | 9/2023 | Tang | H04W 12/08 |
| | | | 726/12 |
| 2024/0235984 A1* | 7/2024 | Chunduri | H04L 45/302 |

FOREIGN PATENT DOCUMENTS

| | | | | |
|---|---|---|---|---|
| WO | 2010127009 A1 | | 11/2010 | |
| WO | WO-2021074613 A1 | * | 4/2021 | H04W 84/18 |
| WO | 2022032093 A1 | | 2/2022 | |

OTHER PUBLICATIONS

Younus et al., "Improving the Software-Defined Wireless Sensor Networks Routing Performance Using Reinforcement Learning", IEEE Internet of Things Journal, vol. 9, No. 5, pp. 3495-3508, Mar. 1, 2022.

Extended European Search Report, EP Application No. 24169726.7, European Patent Office, Sep. 17, 2024 (5 pages).

* cited by examiner

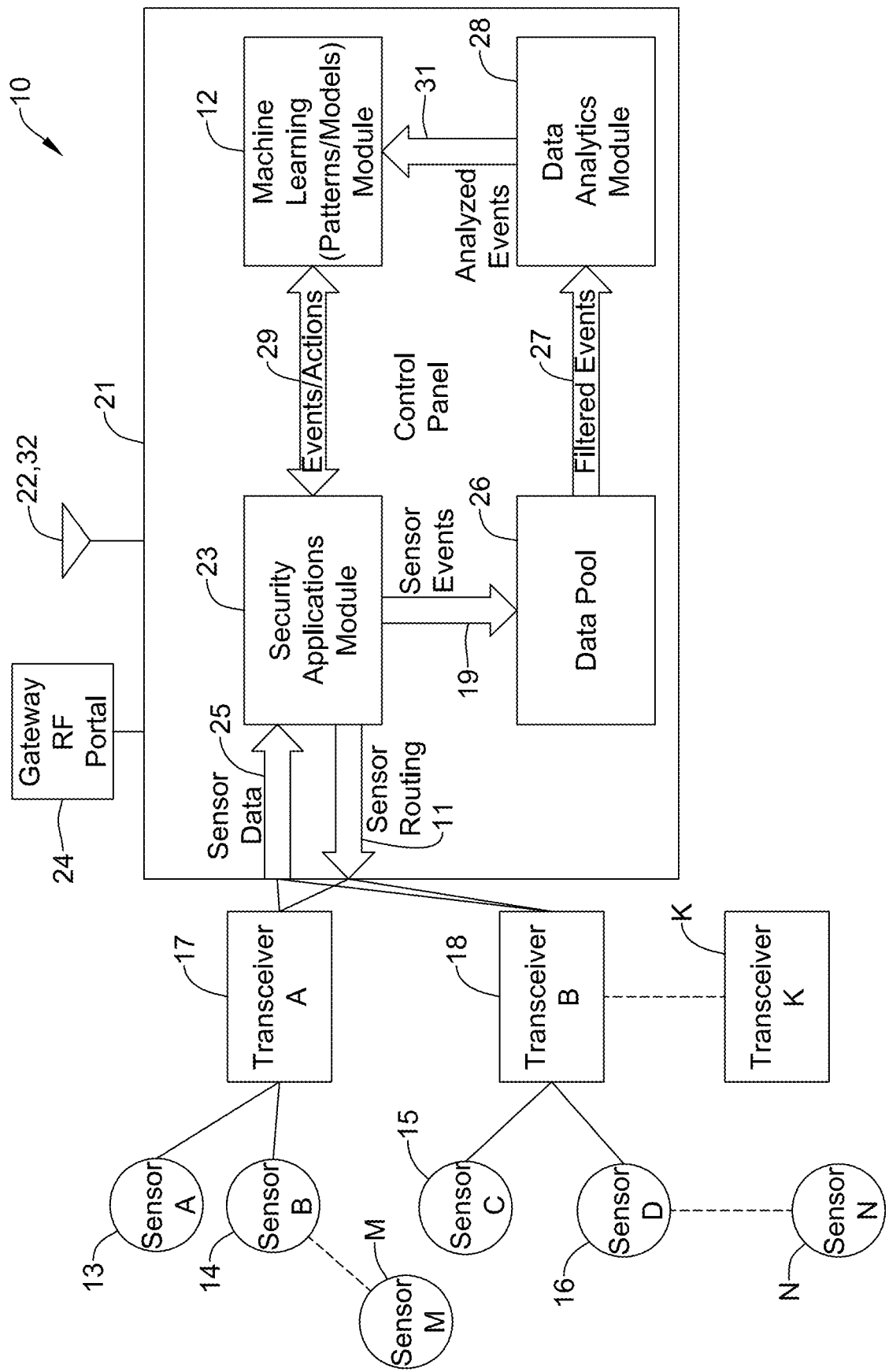

SYSTEM AND APPROACH OF WIRELESS SENSOR AUTO ROUTING USING MACHINE LEARNING

BACKGROUND

A present disclosure pertains to instrumentation and particularly to sensors of physical phenomena.

SUMMARY

The present system may relate to using machine learning and associated technologies for auto routing of wireless sensors to one of the multiple radio frequency (RF) portals/gateways which in turn could be interfaced/wired to control panel(s). A deployed machine learning algorithm may incorporate current parameters and historical data, such as signal strength, sensor association, critical sensor response types and disruption in the network, to determine sensor routing for one of the appropriate RF portal/gateway which in turn is interfaced to control panel(s).

BRIEF DESCRIPTION OF THE DRAWING

FIG. 1 is an overall diagram of the present system for sensor auto routing.

DESCRIPTION

The present system may relate to using machine learning and associated technologies for auto routing of wireless sensors to one of the multiple radio frequency (RF) portals/gateways which in turn may be interfaced/wired to control panel(s). A deployed machine learning algorithm may incorporate current parameters and historical data, such as signal strength, sensor association, critical sensor response types and disruption in the network, to determine sensor routing for one of the appropriate RF portal/gateway which in turn is interfaced to control panel(s). The system may help in routing sensors to the RF portals/transceivers/gateways, depending on the signal strength on a time basis, faster sensor association based on weekly schedule, preventing abrupt association by using a weightage table and routing depending on the sensor response type, for examples, smoke, shock, temperature, panic and chemical sensors. The present system may be a smart way of auto routing the sensors to different RF portals by using a pattern study from existing sensor and RF portal historical events in the system, which may resolve mentioned limitations of auto routing only based on present system data.

A security system supports different types of wireless sensors like door contact, PIR sensor, temperature sensor, sounders, and so on. To accommodate more sensors in premises, the user/installer may use one or more gateways/RF portals. A sensor may primarily connect with a particular transceiver for communicating alarms and supervision signals. Currently, the sensors may be auto routed based on present system data where transceiver failure or signal strength is contrasted with another transceiver, and so forth. But the present system is not necessarily referring to any of statistical history data which can be very useful in deciding when to appropriately auto route sensor from one RF portal to another one.

The following items are the limitations of doing auto routing only based on present sensor data. There may be unwanted abrupt auto routing of the sensors from one portal to other portal and returning back to same portal. To understand the current situation in the premises, it may take a longer time and it may lead to unnecessary lead time for auto routing the sensors. Missing the critical sensors while auto routing may lead to missing the life critical alarms from the sensors.

The present system may be a smart way of auto routing the sensors to different RF portals by using a pattern study from existing sensor and RF portal historical events in the system, which may resolve virtually all the above-mentioned limitations of auto routing only based on present system data.

The sensors may send alarm/fault signals and periodically monitor messages to the RF portals; and then the RF portals may send the alarm/fault/monitoring messages to the control panel along with signal strength and a current status of sensor. As well, RF portals may periodically send its status like Tamper, RF jam, and the like, to the control panel. Currently, based on this present system data, the control panel may decide when to auto route the sensors such as during RF portal missing/RF jam/better signal strength to the other RF portals.

FIG. 1 is an overall diagram of the present system for sensor auto routing. The diagram is of an approach for implementing the smart agile routing of sensors using machine learning 12 pattern analysis. Events from all the sensors 13, 14, 15 and 16 and the transceivers 17 and 18 at the secured premises may be analyzed and a pattern study may be conducted based on machine learning 12. There may be more than transceivers 17 and 18 such as transceiver(s) K connected to control panel 21. There may be more than sensors 13-16, such as sensor(s) M and N connected to transceivers 17, 18 and transceiver(s) K, respectfully. The sensor events 19 and transceiver events behavior patterns may be derived out of study and maintained. Sensor events 19 may go from security applications module 23 to a data pool 26. Filtered events 27 may go to data analytics module 28. Analyzed events 31 may go from data analytics module 28 to machine learning module 12. The patterns/models of machine learning module 12 may lead to and vice versa from sensor routing 11 as events/actions 29 via security applications module 23 of the sensors to the appropriate transceivers 17 and 18. Based on the availability of processing speed and memory, a machine learning 12 algorithm may be done in the control panel 21 and/or at a connected cloud 22 via a wireless connection to outside of control panel 21 via gateway/portal 24, or to a cloud 32 via a wired connection. Such connections to clouds 22 and 32 may be also or instead a hybrid of wireless and wired connections. Components of system 10 of FIG. 1 may be connected and/or interconnected in a wireless and/or wired fashion.

Security application module 23 may be a critical decision-making application of control panel, which detects the status from various types of sensors like door contacts, PIR, seismic sensor, glass break sensor, and so forth, based on a current system/partition state like an Arm (User out of premise)/Disarm (User inside the premise) and a zone response type that decides it is an alarm/trouble/tamper/release/Mask, and accordingly it may report specific alert messages (SIA or Contac ID code) to a central monitoring station (CMS), dedicated cloud, or operate the apparent required outputs/Sirens and relays in the local system within the specified time. It may periodically monitor each and every interfaced devices like zones and peripherals connected to the control panel. It may connect to the outside world through the Ethernet or cell radio module. In this idea, one may be majorly concentrating on how the wireless sensors are sharing the status message to control panel and how optimistically one can auto route the sensor to an appropriate RF portal 24 to achieve the same.

Machine learning 12 and data analytics steps of data analytics module 28 and analyzed event 31 may be noted in the following items. First, each time when a status message or monitoring signal received from a wireless sensor along with its signal strength for each RF portal may be collected by the data pool. Second, once data are collected, then they will be filtered for duplicate entries, keep only the inliers, and remove all the outliers. It may create a new data array of received data and share it with data analytics module 28. Third, data analytics module 28 may then prepare a cluster for each sensor with its signal strength value across RF portals by using unsupervised or deep neural network (DNN) approaches. Fourth, one may analyze the cluster data from each sensor and rank the cluster data based on signal strength with each RF portal along with date and time. One may as well analyze this cluster of sensor data and its current associated primary data transceiver along with signal strength and prepare a weightage map. Fifth, in the machine learning module 12, one may form a model, which can rank the based on the input data. A trained model may be deployed here, which is made learnable to adaptively prepare a weekly schedule like at a particular time of the day each sensor association is good with a respective RF portal. Sixth, once the schedule is prepared, then the recommendation may be fed to the security applications module 23 to appropriately auto route the wireless sensors to appropriate RF portals.

A feature may involve routing that may be based on the sensors 13-16 and transceivers 17-18 association pattern. Based on the pattern study, the control panel 21 may prepare a weekly schedule like at a particular time of the day for each sensor 13-16 association that is good with an RF portal at the secured premises. For a few sensor weekdays, if the signal strength is good with transceiver-17 and in the weekends the signal strength is always better with transceiver-18, then accordingly panel 21 can plan to route 11 the sensors 13-16 automatically based on the time and day of the week.

A feature may be where abrupt association of sensors 13-16 and transceivers 17 and 18 can be avoided. Based on the pattern study, the control panel may prepare a chart to which transceiver 17-18 the sensor was associated most of the time in its history. A weightage table from the chart may be derived for each sensor association with the transceiver 17-18. This weightage table may be referred for every time while there is a routing 11 the sensor from one transceiver 17 or 18 to the other one 18 or 17, respectfully. This may avoid unnecessary abrupt routing 11 of the sensors 13, 14, 15 and/or 16 to the transceiver 17 or 18.

A feature may be where auto routing 11 is based on a sensor response type. Based on the sensor response type configuration, the control panel 21 can decide which sensors 13, 14, 15 and 16 need to be auto routed 11 based on a priority response type. One may assume that a life critical smoke sensor, panic sensor and CO2 sensor are highly critical sensors. Each transceiver 17 and 18 may have a limitation like a number of sensors it can handle, in the field if one transceiver 17 or 18 is having communication failure, then those associated sensors 13, 14, 15 and/or 16 may need to be routed to the other transceiver 18 or 17. But the other transceiver 18 or 17 may have a capacity to handle only two more sensors. In that case, the control panel 21 may need to decide out of all the sensors 13-16 of which two can be routed to this transceiver 18 or 17 based on its response type.

A security system or security applications module 23 may support different types of wireless sensors like a door contact, PIR sensor, shock sensor, temperature sensor, sounders, and so forth. To accommodate more sensors at a premise, the user/installer may use more than one gateway/RF portal 24. The sensor may primarily connect with a particular transceiver 17 or 18 for communicating alarms and supervision signals. Currently, the sensors may be auto routed 11 based on present system data like transceiver failure or that signal strength has a contrast with another transceiver, and so on. But it is not necessarily referring to any of statistical history data which may be very useful in deciding when to auto route a sensor 13, 14, 15 and/or 16 from one RF portal 24 to another one, appropriately.

The following are the limitations of doing auto routing 11 only based on present sensor data 25. There may be unwanted abrupt auto routing of the sensors from one portal to another portal and returning back to the same portal. To understand the current situation in the premises, it may take a longer time and lead to unnecessary lead time for auto routing 11 the sensors 13, 14, 15 and/or 16.

Missing the critical sensors while auto routing 11 may lead to missing the life-critical alarms from those sensors. A smart way of auto routing the sensors to different RF portals 24 may be by using a pattern study from an existing sensor and RF portal historical events in the system, which may resolve all the above-mentioned limitations of auto routing only based on present system data.

The sensors may send the alarm/faults signal and periodically a monitoring message to the RF portals 24. Then the RF portals may send the alarm/fault/monitoring messages to the control panel 21 along with signal strength and current status of sensor. As well, RF portal 24 may periodically send its status like tamper, RF jam, and so forth, to the control panel 21. Currently based on the present system, data control panel 21 may decide when to auto route 11 the sensors 13-16 like during RF portal 24 missing RF jam or better signal strength to the other RF portals.

The present approach may be to collect a pattern study of each sensor signal's strength, RF portal association, fault events information, and so forth. The pattern study may be done in the initial learning period and/or periodic pattern study. With this pattern study, the control panel knows very well that at a particular time of the day the sensor association is good with which RF portal, assumes weekdays the signal strength is good with transceiver-17, but on the weekends the signal strength is always better. With transceiver-18, this may happen due to the closing of some doors or some arrangements being changed at the premises on weekends. Based on this pattern study, the panel 21 can plan to route the sensors automatically based on the time and day of the week.

With this pattern study, the control panel 21 may know to which transceiver the sensor was associated most of the time in the past. With this information, a weightage table can be derived for each sensor of sensors 13-16 to the transceiver 17 or 18. The weightage table may be used for routing the sensor from one transceiver to another one. This may avoid an unnecessary abrupt routing 11 of the sensors to the transceiver. Each transceiver may have a limitation of a number of sensors it can handle. For example, transceiver 17 may have a capacity of handling only ten sensors. Two transceivers 17 and 18 may be installed at a site and each transceiver is associated with eight sensors. Suddenly, if one transceiver 17 is having a communication failure, then the eight sensors need to be routed to another transceiver 18. But the other transceiver 18 may have a capacity to handle only two more sensors. In that case, the control panel 21 may decide out of eight sensors which two sensors can be routed to this transceiver 18 based on its response type. Like fire sensors, CO2 or panic sensors may be kept on priority and routed first.

The present system 10 may provide a smart way of routing the sensors 13-16 to the transceiver 17 or 18, which will avoid unnecessary abrupt routing, based on the pattern study, control panel 21 automatically routes the sensors, based on the sensor response it decided and routed the sensors.

Machine learning 12 may be used to determine the activity detection based on the sensor data 25. The present system may speak about machine learning 12 analysis of the events from sensors 13-16 and transceiver 17 or 18 that can be used for smartly agile routing the sensors 13-16 across different transceivers 17 and 18, appropriately.

FIG. 1 may depict an approach of implementing a smart agile routing of sensors using machine learning pattern analysis. The events from all of the sensors and the Transceivers at the secured premises may be analyzed and the pattern study can be conducted based on machine learning. The sensor and transceiver event behavior patterns derived out of the pattern study and maintained, may lead to auto routing of the sensors to the appropriate transceivers. Based on the availability processing speed and memory, the machine learning algorithm may be done in the control panel and/or at the connected cloud.

This paragraph and the two next paragraphs indicate items that may be favorable to the present system. Auto routing may be based on the sensor and transceiver association pattern based on the pattern study, the control panel can prepare a weekly schedule like at a particular time of the day which for each sensor association that is good with which RF portal is at the secured premises, like for a few sensors weekdays the signal strength is good with transceiver 17 and in the weekends, the signal strength may be always better with transceiver 18, then accordingly, the panel can plan to route the sensors automatically based on the time and day of the week.

To avoid abrupt association of sensors and transceiver, based on the pattern study, the control panel may prepare a chart to which transceiver the sensor was associated most of the time in its history. With this, a weightage table may be arrived for each sensor association with the transceiver. This weightage table may be referred for every time while routing the sensor from one transceiver to another one. This approach may avoid unnecessary abrupt routing of the sensors to the transceiver.

Auto routing may be based on sensor response type. Based on the sensor response type configuration, the control panel may decide which sensors need to be auto-routed based on a priority response type in which one can assume a life critical smoke sensor, panic sensor and CO2 sensor are highly critical sensors. Every transceiver may have a limitation such as a number of sensors it can handle. For instance, in the field if one transceiver is having communication failure, then those associated sensors need to be routed to another transceiver. However, the other transceiver may have a capacity to handle only two more sensors. In that case, a panel may decide out of all the sensors which two can be routed to this transceiver based on its response type.

The present system may have a software component. A stack level may be an edge hardware device with embedded software that can be connected securely to the cloud via wired or wireless connection. Software type may be embedded that runs in a device/unit (firmware).

An IoT stack level may be an edge hardware device with embedded software that can be connected securely to the cloud via a wired or wireless connection. The present system may generate or capture data. An edge device may monitor the wireless sensor and transceiver data received.

To recap, an apparatus for sensor routing may incorporate a control panel, one or more transceivers connected to the control panel, and one or more sensors connected to each transceiver. The control panel may incorporate a security applications module connected to the one or more transceivers, and a machine learning module connected to the security applications module. Sensor data may be provided from the one or more sensors via the one or more transceivers to the security applications module. The sensor data may go from the security applications module to an algorithm of the machine learning module where a pattern study is formed. Based on the pattern study, a chart may indicate which transceiver of the one or more transceivers that the sensor was associated with most of the time during its operational history. A weightage table from the chart may be derived for each association of the sensor with the transceiver. The weightage table may be referred to for each time while there is a routing of the sensor from one transceiver to another, which can avoid an unnecessary abrupt routing of one of the one or more sensors to a transceiver of the one or more transceivers.

The one or more sensors may be wireless sensing devices.

If a transceiver is having a communication failure, then the sensor or sensors associated with the transceiver may be routed to another transceiver.

The one or more sensors may be selected from a group of sensors including a door contact sensor, PIR sensor, shock sensor, temperature sensor, smoke sensor, sounders, microphone, imaging sensor, light sensor, smell sensor, touch sensor, finger print sensor, RF sensor, iris sensor, current sensor, natural gas sensor, CO2 sensor, odor sensor, panic sensor, glass break sensor and chemical sensor. There may be other sensors.

A system for sensor auto routing may incorporate a control panel, one or more transceivers connected to the control panel, and one or more sensors connected to the one or more transceivers. The control panel may incorporate a security applications module connected to the one or more transceivers, and a machine learning module connected to the security applications module. Sensor data may be provided from the one or more sensors via the one or more transceivers to the security applications module. The sensor data may go from the security applications module to an algorithm of the machine learning module where a pattern study is formed. A schedule of an association of a sensor with a transceiver may be developed based on the pattern study. The schedule may indicate when a strength of a signal of the association of the sensor with a transceiver of the one or more transceivers is sufficient to automatically route the sensor to the transceiver.

The one or more sensors may be wireless sensing devices.

The control panel may collect the pattern study which includes information about a selected sensor.

The information may include one or more items of a group incorporating signal strength of the sensor, fault events, and a time of a day that the signal strength in units is most favorable relative to a measured or predetermined maximum of the units.

A weightage may be derived from the information.

The pattern study may indicate which transceiver that sensor was associated with a most time over a predetermined period of time.

A weightage table may be developed from the pattern study, and the weightage table may be used for routing the sensor from one transceiver to another transceiver to avoid abrupt routing of a sensor from one transceiver to another transceiver from exceeding a limitation of a number of sensors that a transceiver can operate.

The routing of the sensor from one transceiver to another transceiver may be automated and be a smartly agile routing of the sensor based on a machine learning pattern analysis.

The weightage table may be derived for an association of a sensor with a transceiver.

The weightage table may be referred to each time a sensor is routed from one transceiver to another transceiver.

If a transceiver is having a communication failure, then a sensor or sensors associated with the transceiver may be routed to another transceiver.

A mechanism for sensor routing may incorporate one or more transceivers connected to a control panel, and one or more sensors connected to the one or more transceivers. The control panel may incorporate a security module connected to the one or more transceivers, and a machine learning module connected to the security module. Sensor data may be provided from the one or more sensors via the one or more transceivers to the security module. The sensor data may go from the security module to an algorithm of the machine learning module where the sensor data are analyzed by the algorithm according to the type of response which indicates which sensors of the one or more sensors are auto routed on the basis of a priority response type, to a particular or selected transceiver, portal, cloud, gateway, or storage.

The basis of the priority response type may be proportional to the criticality of the sensor data.

The control panel may determine when to auto route a sensor.

One or more sensors may be wireless for connection.

One or more sensors may be wired for connection.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An apparatus for sensor routing comprising:
    a control panel;
    one or more transceivers connected to the control panel; and
    one or more sensors connected to each transceiver; and
    wherein:
    the control panel comprises:
        a security applications module connected to the one or more transceivers; and
        a machine learning module connected to the security applications module; and
        wherein:
        sensor data are provided from the one or more sensors via the one or more transceivers to the security applications module; and
        the sensor data go from the security applications module to an algorithm of the machine learning module where a pattern study is formed;
    based on the pattern study, a chart that indicates which transceiver of the one or more transceivers that the sensor was associated with most of the time during its operational history;
    a weightage table from the chart is derived for each association of the sensor with the transceiver; and
    the weightage table is referred to for each time while there is a routing of the sensor from one transceiver to another, which avoids an unnecessary abrupt routing of one of the one or more sensors to a transceiver of the one or more transceivers.

2. The apparatus of claim 1, wherein the one or more sensors are wireless sensing devices.

3. The apparatus of claim 1, wherein if a transceiver is having a communication failure, then the sensor or sensors associated with the transceiver are routed to another transceiver.

4. The apparatus of claim 1, wherein the one or more sensors are selected from a group of sensors comprising a door contact sensor, PIR sensor, shock sensor, temperature sensor, smoke sensor, sounders, microphone, imaging sensor, light sensor, smell sensor, touch sensor, finger print sensor, RF sensor, iris sensor, current sensor, natural gas sensor, CO2 sensor, odor sensor, panic sensor, glass break sensor and chemical sensor.

5. A system for sensor auto routing comprising:
    a control panel;
    one or more transceivers connected to the control panel; and
    one or more sensors connected to the one or more transceivers; and
    wherein:
    the control panel comprises:
        a security applications module connected to the one or more transceivers; and
        a machine learning module connected to the security applications module; and
        wherein:
        sensor data are provided from the one or more sensors via the one or more transceivers to the security applications module; and
        the sensor data go from the security applications module to an algorithm of the machine learning module where a pattern study is formed;
    a schedule of an association of a sensor with a transceiver is developed based on the pattern study; and
    the schedule indicates when a strength of a signal of the association of the sensor with a transceiver of the one or more transceivers is sufficient to automatically route the sensor to the transceiver.

6. The system of claim 5, wherein the one or more sensors are wireless sensing device.

7. The system of claim 5, wherein the control panel collects the pattern study which includes information about a selected sensor.

8. The system of claim 7, wherein the information comprises one or more items of a group comprising signal strength of the sensor; fault events, and a time of a day that the signal strength in units is most favorable relative to a maximum of the units.

9. The system of claim 7, wherein a weightage is derived from the information.

10. The system of claim 7, wherein the pattern study indicates which transceiver that sensor was associated with a most time over a predetermined period of time.

11. The system of claim 5, wherein a weightage table is developed from the pattern study, and the weightage table is used for routing the sensor from one transceiver to another transceiver to avoid abrupt routing of a sensor from one transceiver to another transceiver from exceeding a limitation of a number of sensors that a transceiver can operate.

12. The system of claim 11, wherein the routing of the sensor from one transceiver to another transceiver is automated and is a smartly agile routing of the sensor based on a machine learning pattern analysis.

13. The system of claim 12, wherein the weightage table is derived for an association of a sensor with a transceiver.

14. The system of claim 13, wherein the weightage table is referred to each time a sensor is routed from one transceiver to another transceiver.

15. The system of claim 14, wherein if a transceiver is having a communication failure, then a sensor or sensors associated with the transceiver are routed to another transceiver.

16. A mechanism for sensor routing comprising:
one or more transceivers connected to a control panel; and
one or more sensors connected to the one or more transceivers; and
wherein:
the control panel comprises:
a security module connected to the one or more transceivers; and
a machine learning module connected to the security module; and wherein:
sensor data are provided from the one or more sensors via the one or more transceivers to the security module; and
the sensor data go from the security module to an algorithm of the machine learning module where the sensor data are analyzed by the algorithm according to the type of response which indicates which sensors of the one or more sensors are auto routed on the basis of a priority response type, to a particular or selected transceiver, portal, cloud, gateway, or storage.

17. The mechanism of claim 16, wherein the basis of the priority response type is proportional to the criticality of the sensor data.

18. The mechanism of claim 16, wherein the control panel determines when to auto route a sensor.

19. The mechanism of claim 16, wherein one or more sensors are wireless for connections.

20. The mechanism of claim 16, wherein one or more sensors are wired for connections.

* * * * *